Nov. 23, 1965   R. P. KIDWELL   3,219,851
ELECTRICAL ENERGY CONVERSION DEVICE
Filed May 17, 1961   3 Sheets-Sheet 1

INVENTOR.
ROBERT P. KIDWELL
BY
*Wallenstein, Spangenburg & Hattis*
ATTYS

Nov. 23, 1965 R. P. KIDWELL 3,219,851
ELECTRICAL ENERGY CONVERSION DEVICE
Filed May 17, 1961 3 Sheets-Sheet 2
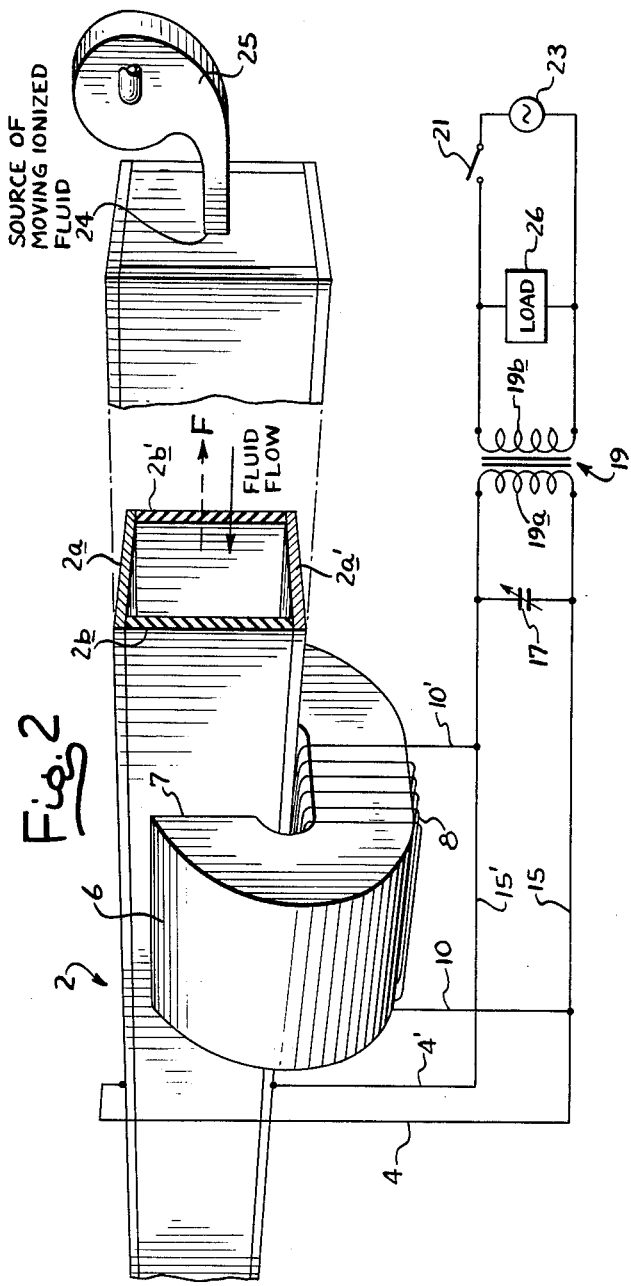
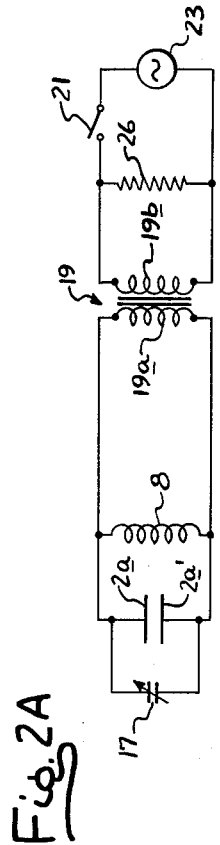
INVENTOR.
ROBERT P. KIDWELL
BY
ATTYS.

Nov. 23, 1965
R. P. KIDWELL
3,219,851
ELECTRICAL ENERGY CONVERSION DEVICE
Filed May 17, 1961
3 Sheets-Sheet 3
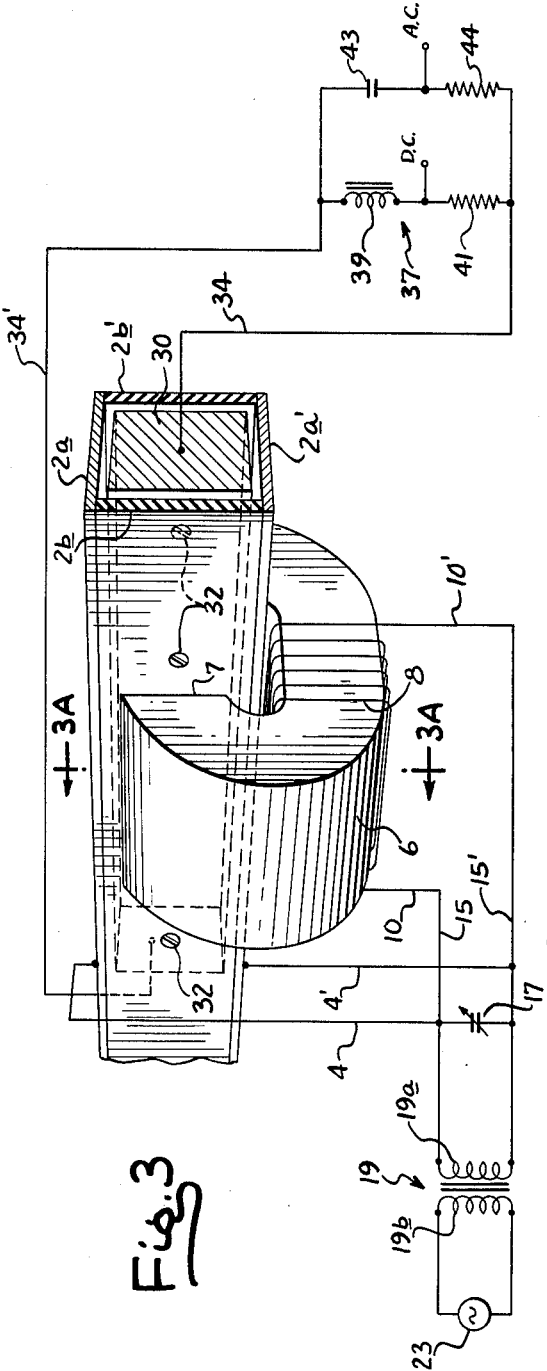
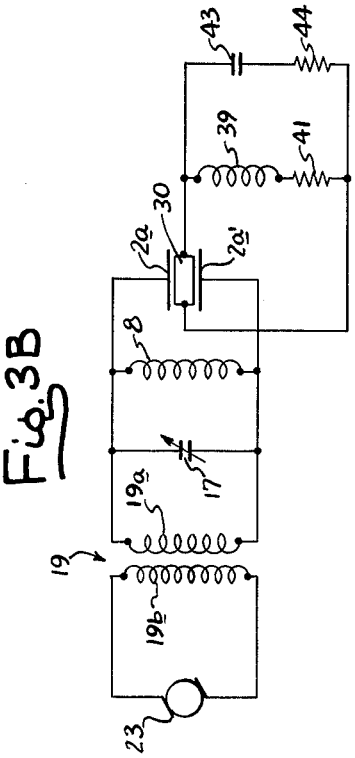
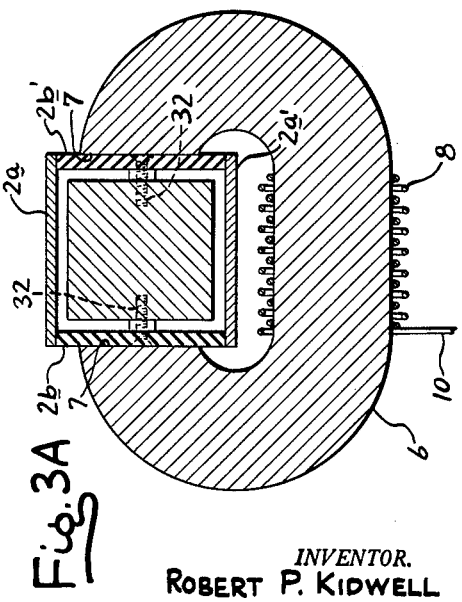
INVENTOR.
ROBERT P. KIDWELL
BY
ATTYS.

United States Patent Office 3,219,851
Patented Nov. 23, 1965

3,219,851
ELECTRICAL ENERGY CONVERSION DEVICE
Robert P. Kidwell, 2213 Calle de Suenos,
Las Cruces, N. Mex.
Filed May 17, 1961, Ser. No. 110,777
6 Claims. (Cl. 310—11)

The present invention relates to electrical devices for converting electrical energy at one frequency to direct current and/or current at other frequencies and for converting electrical to mechanical energy or mechanical to electrical energy.

Recently, researchers have expressed great interest in the field of magnetohydrodynamics which involves the interaction of magnetic fields and electrically conducting gases and other conducting fluids. Possible important applications of magnetohydrodynamics have been investigated in the fields of electrical power generation, ion acceleration and propulsion systems. The present invention involves a unique application of magnetohydrodynamics involving electromagnetic fields interacting with conductive mediums to provide efficient generation of electrical power, and efficient conversion of electrical energy at one frequency to alternating current of twice this frequency an/or to direct current. Another important application of the invention is in the pumping of both dielectric and conductive materials by purely electromagnetic means. In one application of the invention, electrical energy is extracted from flowing conductive gases by simple, rugged apparatus with an exceedingly high conversion efficiency. The main advantages of the invention lie in the high degree of flexibility, efficiency, simplicity, and ruggedness of the equipment constituting the present invention. For example, electrical energy can be extracted from flowing streams of conductive gases at conversion efficiencies as high as 80–90%.

Pumping of dielectric and other fluids has heretofore generally been carried out by purely mechanical means involving the direct contact of the fluid to be pumped with impeller blades and the like. Such pumping devices are relatively inefficient and, in the case where highly corrosive fluids are involved, require expensive and difficult to maintain pumping equipment. In contrast, the present invention effects an efficient pumping action by purely electromagnetic means.

The various advantages broadly described above are accomplished in the present invention through the interaction of orthogonally related alternating magnetic and electric fields operated at the same frequency and displaced in phase by approximately 90°. Although orthogonally related magnetic and electric fields have been heretofore used in various ways for various applications, none have been alternating fields phased and used in the manner to be described.

In accordance with the present invention, the cross electric and magnetic fields are caused to interact with various media in different ways, depending upon the application invloved. Thus, when the invention is applied as a pump, the aforesaid electric and magnetic fields are externally generated and applied to a conduit carrying the fluid to be pumped. In the most preferred form of the present invention, the conduit comprises a pair of opposed conductive walls forming a pair of electric field developing electrodes and joined by a pair of insulating walls. An alternating current electric field is developed between the conductive walls forming a pair of electric field developing voltage thereto at a given frequency. The magnetic field is generated within the conduit at right angles to the electric field by placing the conduit in an air gap of a C-shaped core of magnetic material forming the core of a transformer. In a preferred manner to be described, alternating current is fed to windings of the transformer to provide an alternating magnetic field which is displaced 90° in phase from the aforesaid electric field. A force is developed within both dielectric or conductive materials in the conduit which force impels the same in a given direction through the conduit. The pumping force is a function of the interaction between the electric and magnetic fields with charge-producing constituents of the pumped medium. Dielectric materials, although poor conductors of electricity, nevertheless have displacement currents or charges induced therein by the alternating fields to supply the condition for pumping action. Although crossed direct current magnetic and electric fields have the capability of imparting forces upon ionized materials, it is not useful for pumping dielectric materials and is much less satisfactory than the orthogonally phased alternating current electric and magnetic fields of the present invention.

If an ionized or otherwise conductive medium is caused to move through the conduit in a direction opposite to the direction of the impelling force generated by the externally generated orthogonal electrical and magnetic fields, energy is actually extracted from the flowing medium. Once this extraction takes place, it is theoretically possible to use the generated current to continue the initially externally generated electric and magnetic fields.

The medium acted upon by the cross alternating electrical and magnetic fields of the present invention could also be a solid conductive body. It has been discovered that by anchoring such a conductive body to the walls of the aforesaid conduit in the region of the crossed electric and magnetic fields in a manner where the conductive body is insulated from the conductive walls of the conduit, useful electrical energy can be obtained by coupling an output circuit across the ends of the conductive body. The electrical energy comprises a direct current component and an alternating current component at twice the frequency of the alternating eelctric and magnetic fields. Both the direct current and alternating current energy components can be extracted from the output circuit by suitable filters.

Other advantages and features of the present invention will become apparent upon making reference to the specification to follow, the claims and the drawings wherein:

FIG. 2 is a view of the present invention applied as an alternating current generator which extracts energy from a moving ionized fluid;

FIG. 2A is a simplified electrical diagram of the apparatus shown in FIG. 2;

FIG. 3 is an application of the present invention as a device for converting an alternating current of a primary energizing voltage source to either direct current or alternating current at twice the frequency of the energizing voltage;

FIG. 3A is a transverse section of FIG. 3 taken along section line 3A—3A therealong; and FIG. 3B is a simplified electrical diagram of the apparatus of FIG. 3.

Figure 1:
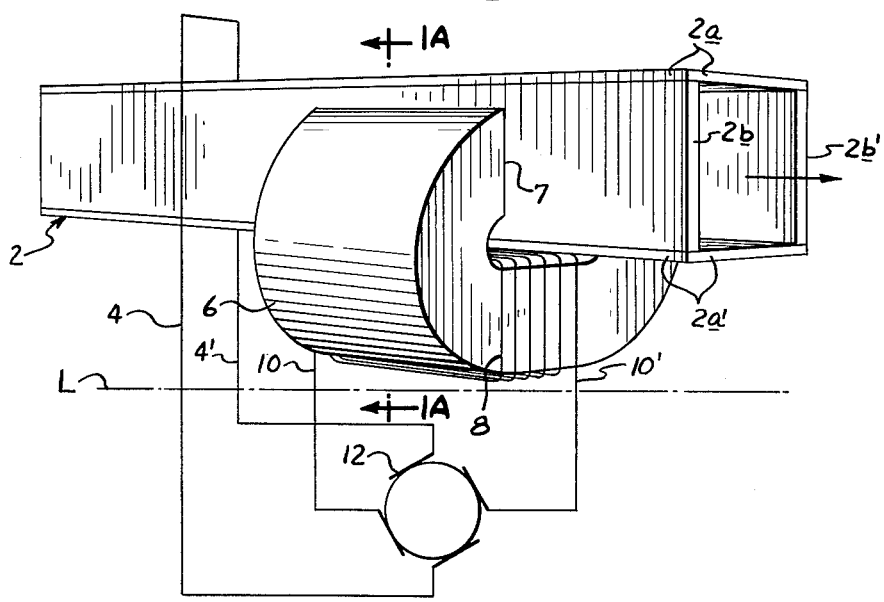
FIG. 1 is a perspective view of the preferred form of the present invention applied as a pumping device.
Figure 1A:
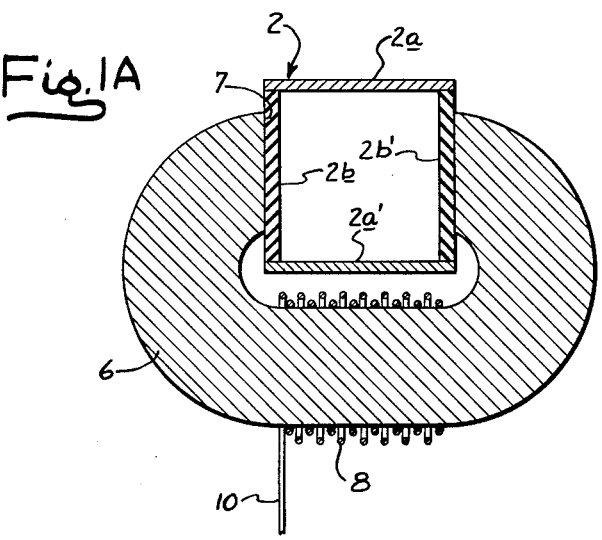
FIG. 1A is a transverse section taken along section line 1A—1A in FIG. 1.

Referring now and more particularly to FIGS. 1 and 1A, that portion of the apparatus shown above the dotted line L represents a preferred form of electromagnetic apparatus which is applicable to all of the aforementioned applications of the invention. The connections and components shown below the dotted line L are used to operate the apparatus shown as a device for pumping dielectric or conductive fluids. The apparatus there shown includes a conduit generally indicated by reference numeral 2 having upper and lower conductive walls 2a–2a′ made of metal or other suitable material and spaced insulating side walls 2b–2b' bridging the corresponding longitudinal marginal portions of the conductive walls 2a and 2a'. Conduit 2 forms a fluid-tight passageway which interconnects the supply of the fluid to be pumped with the point at which the fluid is to be carried. A pair of conductors 4–4' are respectively connected to the conductive walls 2a and 2a' of the conduit.

The conduit 2 is placed in the air gap 7 of a C-shaped core 6 of magnetic material. The spaced confronting surfaces of the core 6 defining the margins of the air gap engage or are contiguous to the insulating side walls 2b–2b' of the conduit 2. Windings 8 are wound around the core and the ends of the windings are connected to conductors 10–10'.

In the various forms of the invention to be described, alternating voltages of proper phase appear on or are fed to the conductors 4–4' and 10–10' leading to the conductive walls 2a–2a' and windings 8 in different ways to produce orthogonally phase crossed electric and magnetic fields. In each instance voltages are either externally or internally generated to produce an alternating electric field extending between the conductive walls 2a–2a' and an alternating magnetic field at right angles to the electric field. The phase of the magnetic field lags or leads the phase of the alternating electric field by about 90° so that the two fields are orthogonally related in both a physical as well as a time sense. In the pump application of the invention shown in FIG. 1, the conductors 4–4' and 10–10' lead to the terminals of a voltage generator 12 which apply voltages of the proper phase to produce the aforementioned electric and magnetic fields.

As an illustrative example of the invention, the voltage applied across the plate 2a and 2a' may be 100 volts rms. and the magnetic field may be 1000 gauss rms. As previously indicated, the fluid pumped by the device illustrated in FIG. 1 is most desirably a gaseous or liquid fluid but it may also be a solid material provided the solid material is kept from short circuiting the conductive walls 2b—2b. It is apparent also that the fluid to be pumped must not be so highly ionized as to represent a short circuit path for current flow between the plates 2a and 2a'. The resulting interaction between the orthogonally related electric and magnetic fields is to provide an extremely efficient pumping device which uses little or no power except when it is effective to pump fluid through the conduit. When there is no fluid to pump, the apparatus is in an idle state which uses very little power in comparison with mechanical pumping devices which must impart movement to impeller blades and the like even during an idling period.

Referring now to the form of the invention shown in FIG. 2 which is an alternating current generator which extracts energy from a flowing ionized fluid. The corresponding parts of the apparatus shown in FIG. 1 and FIG. 2 have been similarly numbered. In FIG. 2, the conductors 4–4' and 10–10' extending to the conductive walls 2a and 2a' of the conduit 2 and the windings 8 respectively extend to a pair of common conductors 15–15'. The conductive walls 2a and 2a', in effect, form the plates of a capacitor which are coupled in parallel to the windings 8 which constitute an inductance coil. A tuning capacitor 17 is connected between the conductors 15 and 15' for tuning the parallel circuit to resonance.

The conductors 15–15' extend to opposite ends of a secondary winding 19a of a transformer 19. The primary winding 19b of the transformer 19 is coupled through an on-off switch 21 to a generator 23 which generates a voltage at a frequency to which the aforesaid circuit is tuned. When the switch 21 is closed, it will be seen that a voltage will be applied to the conductive walls 2a and 2a' of conduit 2 which is 90° out of phase with the current flowing in the inductance coil 8, which produces a magnetic field in phase with this current. The force which is generated by the interaction of the magnetic and electric fields will act upon the ionized medium in the conduit 2 in the direction indicated by the vector F in FIG. 2.

FIG. 2 shows an apparatus similar to that shown in FIG. 1 but including a source 24 of a moving ionized fluid, which source appears at the output of a fan device 25. It is apparent that this source of moving ionized gas or other fluid can be the byproduct of an industrial process or the like. In accordance with the invention, the source of ionized fluid is caused to flow through the conduit 2 in a direction opposite to the direction of the force vector F. In such case, energy will be extracted from this ionized fluid by the electromagnetic device of the present invention. The energy so extracted will appear across a load 26 at the frequency to which the circuit is tuned by the tuning capacitor 17. For practical reasons, this frequency would be the frequency of the output of generator 23. Once the system begins generating power, the switch 21 could theoretically be opened since the extracted power could maintain the electric and magnetic fields referred to.

Referring now to the embodiment of the invention shown in FIGS. 3 and 3A which is a system for converting alternating current to direct current and an alternating current at twice the frequency of the alternating current. The source of alternating current is the generator 23 coupled through the primary and secondary winding of the transformer 19 to a resonant input circuit which is identical to the corresponding portion of the circuit shown in FIG. 2A. The corresponding parts of these two circuits have been similarly numbered, as are the corresponding parts of the apparatus producing the orthogonal electric and magnetic fields in the conduit 2. Aside from the omission of the on-off switch 21 and the load impedance 26 shown in FIG. 2, the only other difference in the apparatus of FIG. 3 is the conductive medium which is located within the conduit 2 and the electrical circuitry associated therewith. The conductive medium in this form of the invention is a conductive metal bar 30 which is fixedly mounted within the conduit by means of screws 32 passing through the insulating walls 2b and 2b'. The conductive body 30 is spaced from the conductive plates 2a and 2a' so as to be insulated therefrom. A pair of conductors 34–34' are soldered or otherwise electrically connected to the opposite ends of the conductive bar 30. These conductors extend to an output circuit generally indicated by reference numeral 37. The output circuit 37 shown comprises a first branch including an A.C. filter choke 39 in series with a load resistor 41. The other branch comprises a D.C. filter capacitor 43 in series with a load resistor 44.

The operation of the apparatus shown in FIG. 3 is as follows: The generator 23 and the associated resonant circuitry provide crossed orthogonally phased and related electric and magnetic fields in the manner described in connection with the embodiment of FIG. 2A where the generator 23 initially provides these fields. Since the conductive body 30 is permanently anchored to the conduit, it does not use any of the generated energy. However, it can be shown that electrical signals are induced within the conductive bar 30 which have both direct current and double frequency signal components. These two components can be separated out by means of the output circuit 37. The filter choke 39 filters out the alternating current component from this branch circuit so that substantially pure direct current voltage appears across the load resistor 41. In the other branch circuit, the capacitor 43 filters out any direct current component from the load resistor 44 so that a double frequency signal component appears across the resistor 44. Obviously one or both of these branches may be utilized depending upon whether D.C. or A.C. or both of the signal components are desired.

It should be understood that numerous modifications may be made of the preferred forms of the invention described above without deviating from the broader aspects of the invention.

What I claim as new and desire to protect by Letters Patent of the United States is:

1. An electromagnetic electricity generating device comprising: a conduit for an ionized fluid, said conduit including a first pair of insulated electrodes on opposite sides of the conduit, electromagnet means including a coil for providing a magnetic field in the space between said electrodes and extending in a direction generally at right angles to a line extending between said electrodes, and circuit means including means connecting said electrodes and coil together to form a circuit which is resonant at a desired frequency of extraction of energy from said ionized fluid.

2. An electromagnetic transformer for extracting energy from a flowing ionized fluid comprising: a conduit in which said fluid flows, said conduit including a first pair of spaced insulated electrodes on opposite sides thereof, inductance means comprising a coil which when current flows therein provides a magnetic field in the region between said electrodes at right angles to a line extending between said electrodes, means connected to said electrodes and said coil for providing a magnetic field in the space between said electrodes which is displaced 90° in time from an orthogonal electric field extending between said electrodes, said magnetic and electric fields providing a force capable of impelling fluid in a given direction in said conduit, means for forcing ionized fluid through said conduit in a direction opposite to said given direction, and means including tuning means connected to said electrodes and said coil for forming a tunable resonant circuit.

3. An electromagnetic transformer for extracting energy from a flowing ionized fluid comprising: a conduit in which said fluid flows, said conduit including a first pair of spaced insulated electrodes on opposite sides thereof, inductance means comprising a coil which when current flows therein provides a magnetic field in the region between said electrodes at right angles to a line extending between said electrodes, means connected to said electrodes and said coil for providing a magnetic field in the space between said electrodes which is displaced 90° in time from an orthogonal electric field extending between said electrodes, said magnetic and electric fields providing a force capable of impelling fluid in a given direction in said conduit, and means for forcing ionized fluid through said conduit in a direction opposite to said given direction.

4. An electrical generator device comprising: a conduit in which an ionized fluid may flow, said conduit including a first pair of spaced insulated electrodes on opposite sides of said conduit, inductive means comprising a coil arranged to direct its magnetic field within said conduit in the space between said electrodes and in a direction generally at right angles to a line extending between said electrodes, means connecting said electrodes and said coil in parallel circuit relation to form part of a parallel resonant circuit, tuning means for tuning the parallel resonant circuit to a given frequency, a source of ionized fluid under pressure, means connecting said source of ionized fluid to said conduit to cause the same to flow through the conduit in a direction opposite to the impelling force developed in the electric and magnetic fields respectively developed between said electrodes and in said coil, and output means for extracting energy from said parallel resonant circuit induced in part therein by the flow of ionized fluid through said conduit.

5. An electrical generator device comprising: a conduit in which an ionized fluid may flow, said conduit including a first pair of spaced insulated electrodes on opposite sides of said conduit, inductive means comprising a coil arranged to direct its magnetic field within said conduit in the space between said electrodes and in a direction generally at right angles to a line extending between said electrodes, means connecting said electrodes and said coil in parallel circuit relation to form part of a parallel resonant circuit, tuning means for tuning the parallel resonant circuit to a given frequency, alternating current generator means providing an output at said given frequency and coupled in parallel with said parallel resonant circuit, a source of ionized fluid under pressure, means connecting said source of ionized fluid to said conduit to cause the same to flow through the conduit in a direction opposite to the impelling force developed by the electric and magnetic fields respectively developed between said electrodes and in said coil, and output means for extracting energy from said parallel resonant circuit induced in part therein by the flow of ionized fluid through said conduit.

6. An electromagnetic pumping device comprising: a conduit in which an operating medium is to be located and including a first pair of insulated conductive electrodes on opposite sides of the conduit, electromagnet means including a coil for providing a magnetic field in the space between said electrodes and extending in a direction generally at right angles to the line extending between said electrodes, circuit means including means connecting said electrodes and coil together to form a parallel resonant circuit, and energizing voltage means connected to said parallel resonant circuit at the frequency to which the resonant circuit is tuned, whereby the orthogonal electric and magnetic fields alternate 90° out of phase with one another.

References Cited by the Examiner

UNITED STATES PATENTS

| | | | |
|---|---|---|---|
| 1,736,643 | 11/1929 | Beck. | |
| 2,391,801 | 12/1945 | Schade | 307—151 |
| 2,434,705 | 1/1948 | Lago. | |
| 2,715,190 | 8/1955 | Brill | 310—11 |
| 2,787,219 | 4/1957 | Werner | 103—1 |
| 3,002,383 | 10/1961 | Mittelmann | 73—194 |
| 3,011,070 | 11/1961 | Glicksman | 307—88.5 |
| 3,034,002 | 5/1962 | Carlson | 310—11 |

ORIS L. RADER, *Primary Examiner.*

MILTON O. HIRSHFIELD, *Examiner.*